(12) United States Patent
Morita

(10) Patent No.: US 9,977,408 B2
(45) Date of Patent: May 22, 2018

(54) CONTROL DEVICE AND CONTROL METHOD FOR CHANGING OPERATION ACCORDING TO MOTOR TEMPERATURE

(71) Applicant: FANUC CORPORATION, Yamanashi (JP)

(72) Inventor: Yuuki Morita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days. days.

(21) Appl. No.: 15/491,039

(22) Filed: Apr. 19, 2017

(65) Prior Publication Data

US 2017/0308041 A1 Oct. 26, 2017

(30) Foreign Application Priority Data

Apr. 26, 2016 (JP) .................. 2016-088363

(51) Int. Cl.
| | |
|---|---|
| G02B 9/02 | (2006.01) |
| G05B 9/02 | (2006.01) |
| H02P 5/56 | (2016.01) |
| H02P 29/60 | (2016.01) |

(52) U.S. Cl.
CPC .................. *G05B 9/02* (2013.01); *H02P 5/56* (2016.02); *H02P 29/60* (2016.02)

(58) Field of Classification Search
CPC ............. H02P 29/60; H02P 5/56; G05B 9/02
USPC .......................................... 318/563
See application file for complete search history.

(56) References Cited

U.S. PATENT DOCUMENTS

| | | | | |
|---|---|---|---|---|
| 2001/0032550 | A1* | 10/2001 | Narita | B30B 15/146 100/35 |
| 2005/0129794 | A1* | 6/2005 | Chao | B29C 45/5008 425/145 |
| 2013/0026964 | A1* | 1/2013 | Sonoda | H02P 5/50 318/625 |

(Continued)

FOREIGN PATENT DOCUMENTS

| | | |
|---|---|---|
| JP | 9-179623 | 7/1997 |
| JP | 2003-9563 | 1/2003 |

(Continued)

*Primary Examiner* — Eduardo Colon Santana
*Assistant Examiner* — Gabriel Agared
(74) *Attorney, Agent, or Firm* — Wenderoth, Lind & Ponack, L.L.P.

(57) ABSTRACT

To provide a control device and control method capable of preventing overheating of both a master shaft and slave shaft. A control device for machine tools includes a master-shaft motor drive part, a slave-shaft motor drive part and a numerical control part that sends a master-shaft operation command to the master-shaft motor drive part, in which the master-shaft motor drive part drives the master-shaft motor based on the master-shaft operation command received from the numerical control part, the slave-shaft motor drive part drives the slave-shaft motor so as to synchronize with the master-shaft motor based on position feedback information received from the master-shaft motor, and the numerical control part creates the master-shaft operation command to change operation so as to restrict output of the master-shaft motor, upon the temperature of the master-shaft motor exceeding a first predetermined value, or the temperature of the slave-shaft motor exceeding a second predetermined value.

6 Claims, 7 Drawing Sheets

(56) References Cited

U.S. PATENT DOCUMENTS

2013/0226319 A1* 8/2013 Itani .................. G05B 19/4015
                                                    700/60
2015/0102756 A1* 4/2015 Okita ................. H02P 29/0044
                                                    318/473

FOREIGN PATENT DOCUMENTS

| JP | 2009-41130 | 2/2009 |
| JP | 2013-85388 | 5/2013 |
| JP | 2015-75994 | 4/2015 |

* cited by examiner

US 9,977,408 B2

CONTROL DEVICE AND CONTROL METHOD FOR CHANGING OPERATION ACCORDING TO MOTOR TEMPERATURE

This application is based on and claims the benefit of priority from Japanese Patent Application No. 2016-088363, filed on 26 Apr. 2016, the content of which is incorporated herein by reference.

BACKGROUND OF THE INVENTION

Field of the Invention

The present invention relates a control device equipped with a function of changing operation of a machine tool according to the temperature of motors driving the master shaft and slave shaft of the machine tool, as well as a control method of this machine tool.

Related Art

In a machine tool having a spindle or feed shaft driven by a motor, when performing heavy cutting or machining with a high frequency of acceleration and deceleration of this spindle, the motor temperature will rise, and the spindle driving motor may overheat. In order to avoid such a defect, for example, Patent Document 1 describes technology for controlling a servomotor by detecting the temperature of the servomotor driving a moving body, and changing an acceleration-deceleration time constant of the moving body according to the temperature detected and lowering the torque of the motor.

In addition, Patent Document 2 describes technology for creating temperature data by prediction calculating the temperature of a feed shaft motor, comparing this temperature data with predetermined temperature data stored in advance, and changing the acceleration-deceleration time constant of the feed shaft according to the comparison results thereof.

Furthermore, Patent Document 3 describes technology for calculating a virtual motor temperature based on an average load torque of a motor for carriage drive of a flat knitting machine, and reducing the applied electric power to the motor when the virtual temperature exceeds an allowable value.

Patent Document 1: Japanese Unexamined Patent Application, Publication No. 2003-9563
Patent Document 2: Japanese Unexamined Patent Application, Publication No. H09-179623
Patent Document 3: Japanese Unexamined Patent Application, Publication No. 2009-41130
Patent Document 4: Japanese Unexamined Patent Application, Publication No. 2013-85388
Patent Document 5: Japanese Unexamined Patent Application, Publication No. 2015-75994

SUMMARY OF THE INVENTION

However, the inventions according to the above-mentioned Patent Documents 1 to 3 have not been applicable to a drive system operating in a master-slave synchronous fashion.

More specifically, a drive system operating in a master-slave synchronous fashion has a configuration such as that shown in the block diagram of FIG. 7, for example. A drive system 500 that synchronously drives a master-shaft motor 522A and a slave-shaft motor 522B includes a numerical control part 520, a master-shaft motor drive part 521A and a slave-shaft motor drive part 521B, in which the master-shaft motor drive part 521A drives the master-shaft motor 522A, and the slave-shaft motor drive part 521B drives the slave-shaft motor 522B. A master-shaft operation command creation part 531 is provided to the numerical control part 520, and a master-shaft operation command created by this master-shaft operation command creation part 531 is sent to a master-shaft operation command receiver 533 inside of the master-shaft motor drive part 521A, via a communication circuit 532-1. A control unit 534-A inside of the master-shaft motor drive part 521A controls driving of the master-shaft motor 522A, based on the master shaft operation command received from the above-mentioned master-shaft operation command receiving part 533, and position feedback information generated as a result of driving of the master-shaft motor 522A. In addition, the position feedback information generated as a result of driving of the master-shaft motor 522A is transmitted to the slave-shaft motor drive part 521B via the communication circuit 532-2. A predetermined synchronization ratio is multiplied by the transmitted position feedback information, and sent to the control part 534-B within the slave-shaft motor drive part 521B. The control part 534-B drives the slave-shaft motor 522B, based on the received position feedback information and the position feedback information from the slave-shaft motor 522B. Synchronous driving of the master-shaft motor 522A and slave-shaft motor 522B is thereby realized.

Herein, even when applying the inventions according to Patent Documents 1 to 3 to a drive system 500 operating in a master-slave synchronous fashion illustrated in FIG. 7, for example, it would not be possible to avoid overheating of the slave shaft. More specifically, in the case of applying the inventions according to Patent Documents 1 to 3 to the drive system 500 illustrated in FIG. 7, even when controlling the driving of the master-shaft motor 522A in order to prevent overheating of the master shaft, there would be a possibility of overheating of the slave shaft occurring due to the slave-shaft motor 522B not being able to be controlled independently even assuming that the temperature thereof rises.

Therefore, the present invention has the object of providing a control device and control method for changing operation according to motor temperature, which are capable of preventing overheating of both a master shaft and slave shaft.

According to a first aspect of the present invention, a control device (for example, the control device 100, 200 described later) for a machine tool includes: a master-shaft motor drive part (for example, the master-shaft motor drive part 121A, 221A described later) that drives a master-shaft motor (for example, the master-shaft motor 122A, 222A described later), a slave-shaft motor drive part (for example, the slave-shaft motor drive part 121B, 221B described later) that drives a slave-shaft motor (for example, the slave-shaft motor 122B, 222B described later), and a numerical control part (for example, the numerical control part 120, 220 described later) that sends a master-shaft operation command to the master-shaft motor drive part, in which the master-shaft motor drive part drives the master-shaft motor based on the master-shaft operation command received from the numerical control part, and the slave-shaft motor drive part drives the slave-shaft motor so as to synchronize with the master-shaft motor, based on position feedback information received from the master-shaft motor through the master-shaft motor drive part, in which the master-shaft motor drive part includes a first temperature acquisition part (for example, the temperature acquisition part 135A, 236A described later) that acquires a temperature of the master-shaft motor, the slave-shaft motor drive part includes a second temperature acquisition (for example, the temperature acquisition part 135B, 236B described later) part that acquires a temperature of the slave-shaft motor, and the numerical control part creates the master-shaft operation command (for example, the command created by the master-shaft operation command creation part 131, 231 described later) to change operation so as to restrict output of the master-shaft motor, upon the temperature of the master-shaft motor received from the first temperature acquisition part exceeding a first predetermined value, or the temperature of the slave-shaft motor received from the second temperature acquisition part exceeding a second predetermined value.

According to a second aspect of the present invention, in the control device as described in the first aspect, the master-shaft motor drive part may include an acceleration/deceleration determination part (for example, the acceleration/deceleration determination part 235 described later) that determines if the master-shaft motor is performing an acceleration/deceleration operation, or is performing an operation other than acceleration/deceleration, a first temperature variation estimation part (for example, the first temperature variation estimation part 237A described later) that estimates a temperature change of the master-shaft motor according to current flowing in an acceleration/deceleration operation period of the master-shaft motor, and a second temperature variation estimation part (for example, the second temperature variation estimation part 238A described later) that estimates a temperature change of the master-shaft motor according to current flowing in a period of operation other than acceleration/deceleration operation of the master-shaft motor; the slave-shaft motor drive part may include a third temperature variation estimation part (for example, the third temperature variation estimation part 237B described later) that estimates a temperature change of the slave-shaft motor according to current flowing in an acceleration/deceleration operation period of the master-shaft motor, and a fourth temperature variation estimation part (for example, the fourth temperature variation estimation part 238B described later) that estimates a temperature change of the slave-shaft motor according to current flowing in a period of an operation other than the acceleration/deceleration operation of the master-shaft motor; and the numerical control part may create a master-shaft operation command to change operation of the master-shaft motor, based on at least one among a comparison result between the temperature change estimated by the first temperature variation estimation part and the temperature change estimated by the second temperature variation estimation part, and a comparison result between the temperature change estimated by the third temperature variation estimation part and the temperature change estimated by the fourth temperature variation estimation part.

According to a third aspect of the present invention, in the control device as described in the second aspect, the numerical control part may create a master-shaft operation command to change operation of the master-shaft motor so that output during acceleration/deceleration of the master-shaft motor is restricted, in a case of the temperature change estimated by the first temperature variation estimation part being greater than the temperature change estimated by the second temperature variation estimation part, or in a case of the temperature change estimated by the third temperature variation estimation part being greater than the temperature change estimated by the fourth temperature variation estimation part.

According to a fourth aspect of the present invention, in the control device as described in the second aspect, the numerical control part may create a master-shaft operation command to change operation of the master-shaft motor so that load on the master shaft during machining is restricted, in a case of the temperature change estimated by the first temperature variation estimation part being smaller than the temperature change estimated by the second temperature variation estimation part, or in a case of the temperature change estimated by the third temperature variation estimation part being smaller than the temperature change estimated by the fourth temperature variation estimation part.

According to a fifth aspect of the present invention, in the control device as described in the second aspect, the numerical control part may create a master-shaft operation command to change operation of the master-shaft motor so that output during acceleration/deceleration of the master-shaft motor and load on the master shaft during machining are restricted, in a case of a difference between the temperature change estimated by the first temperature variation estimation part and the temperature change estimated by the second temperature variation estimation part being within a predetermined value, or in a case of a difference between the temperature change estimated by the third temperature variation estimation part and the temperature change estimated by the fourth temperature variation estimation part being within a predetermined value.

According to a sixth aspect of the present invention, in a control method for a machine tool using a master-shaft motor drive part that drives a master-shaft motor, a slave-shaft motor drive part that drives a slave-shaft motor and a numerical control part that sends a master-shaft operation command to the master-shaft motor drive part, the control method includes the steps of: driving the master-shaft motor by way of the master-shaft motor drive part so as to synchronize with the master-shaft motor, based on the master-shaft drive command received from the numerical control part; driving the slave-shaft motor by way of the slave-shaft motor drive part based on position feedback information received from the master-shaft motor through the master-shaft motor drive part; acquiring a temperature of the master-shaft motor by way of a first temperature acquisition part included in the master-shaft motor drive part; acquiring a temperature of the slave-shaft motor by way of a second temperature acquisition part included in the slave-shaft motor drive part; and creating the master-shaft operation command by way of the numerical control part to change operation so as to restrict output of the master-shaft motor, upon the temperature of the master-shaft motor received from the first temperature acquisition part exceeding a first predetermined value, or the temperature of the slave-shaft motor received from the second temperature acquisition part exceeding a second predetermined value.

According to the present invention, upon monitoring not only the motor temperature of a master-shaft motor, but also the motor temperature of a slave-shaft motor, it becomes possible to avoid overheating of not only the master shaft, but also the slave shaft by way of controlling operation of the slave shaft according to operation control on the master shaft.

DETAILED DESCRIPTION OF THE INVENTION

Hereinafter, an embodiment of the present invention will be explained while referencing FIGS. 1 to 6.

First Embodiment

First, a first embodiment will be described in detail while referencing FIGS. 1 and 2.

Figure 1:
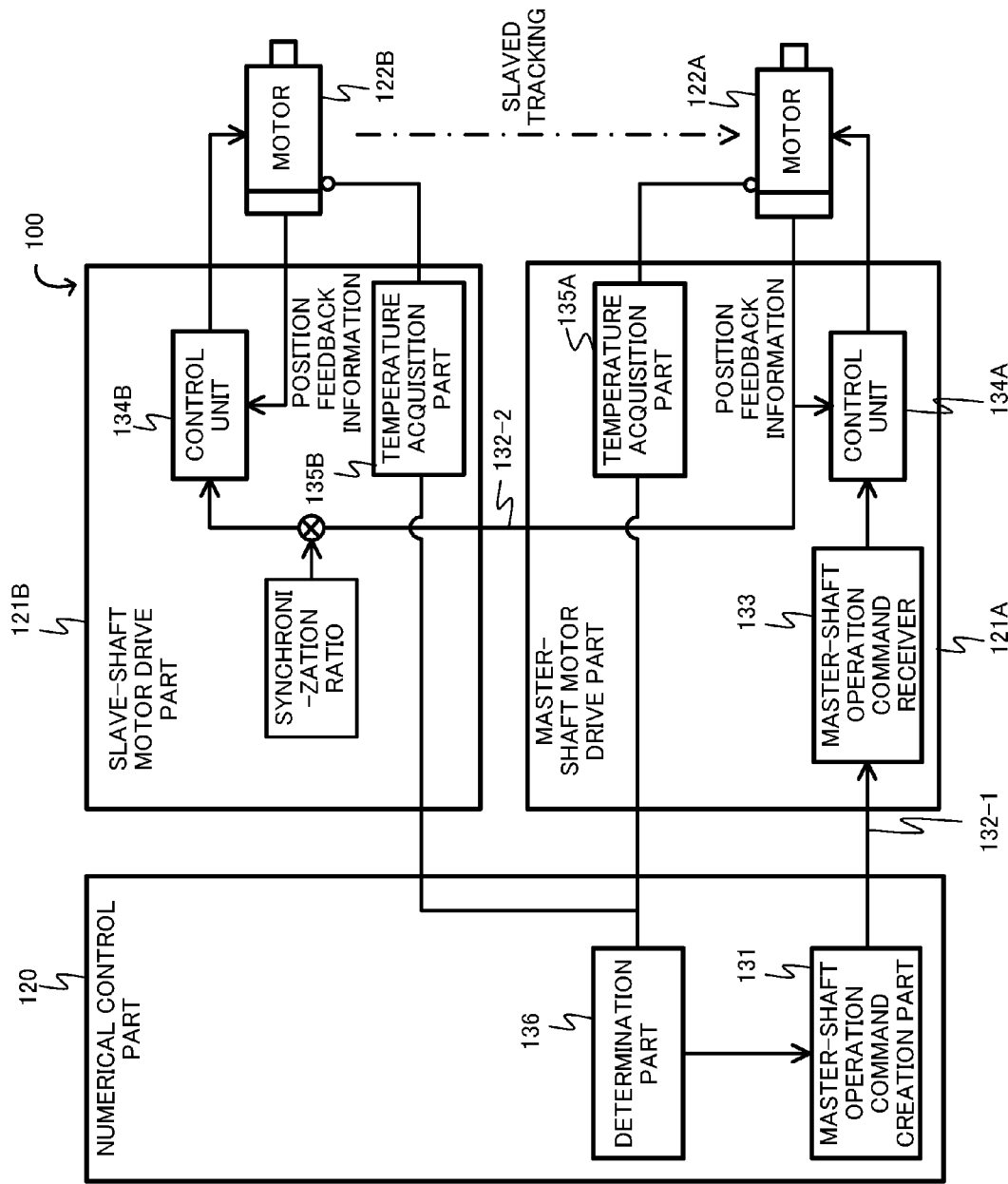
FIG. 1 is a block diagram of a control device according to a first embodiment of the present invention.

As shown in FIG. 1, a control device 100 according to the first embodiment includes a numerical control part 120, a master-shaft motor drive part 121A, and a slave-shaft motor drive part 121B. Furthermore, the numerical control part 120 includes a master-shaft drive command creation part 131 and a determination part 136, the master-shaft motor drive part 121A includes a master-shaft operation command receiver 133, control unit 134A and temperature acquisition part 135A, and the slave-shaft motor drive part 121A includes a control unit 134B and temperature acquisition part 135B.

Herein, the control device 100 is a control device relating to machine tools having a master shaft and a slave shaft, and operating in a master-slave system. As this machine tool, for example, a gear processing machine that produces gears (cog-wheels) by machining a workpiece can be exemplified. In this case, normally, upon defining a tool shaft as the master shaft, a workpiece shaft as the slave shaft, i.e. tool motor as the master-shaft motor and the workpiece motor as the slave-shaft motor, synchronous operation is realized between a tool motor and a workpiece motor.

In addition, the above-mentioned master-shaft motor drive part 121A and slave-shaft motor drive part 121B are each reverse converters provided in order to supply AC drive power to the master-shaft motor 122A and slave-shaft motor 122B.

Figure 7:
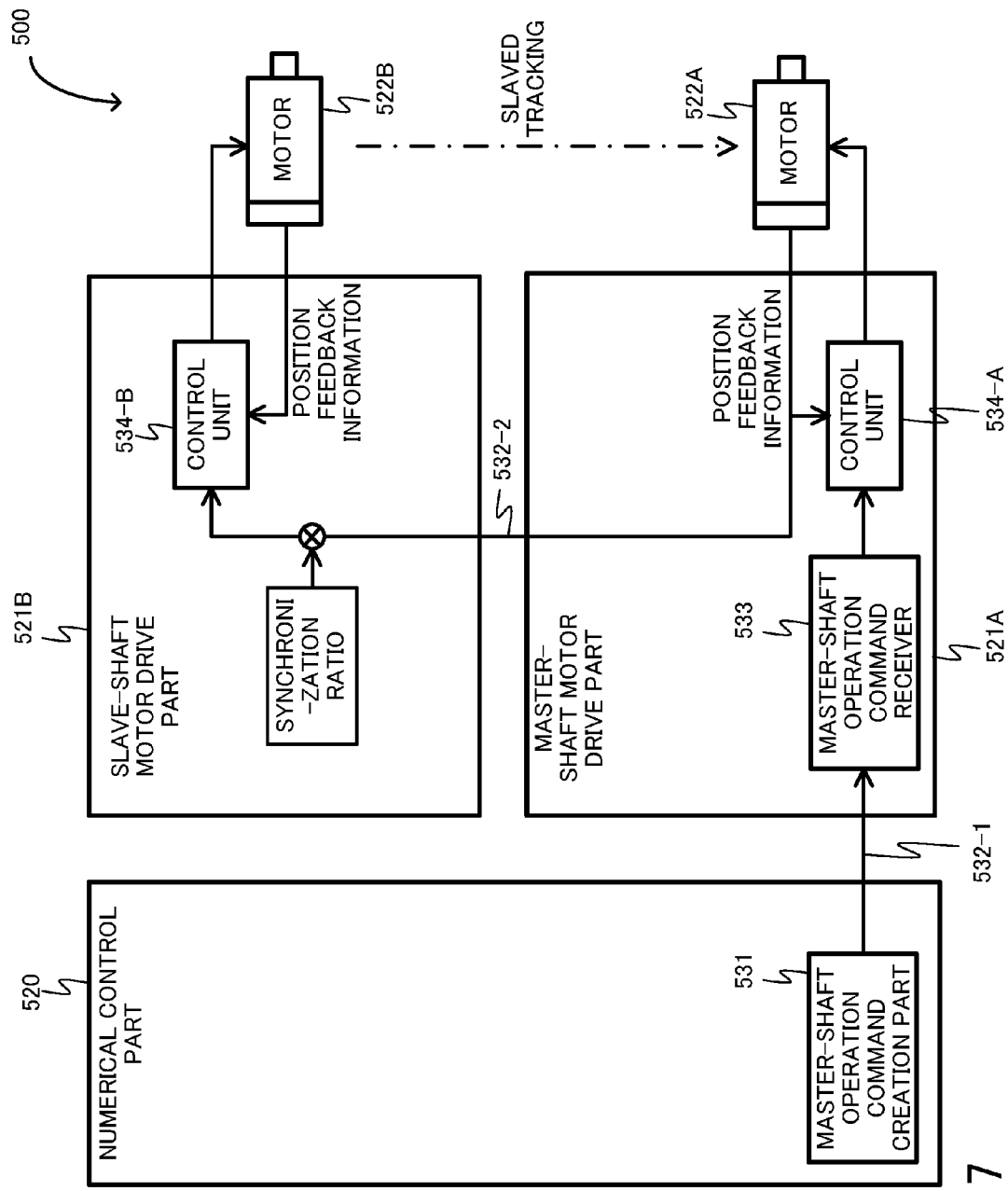
FIG. 7 is a view showing an example of a drive system operating in a master-slave synchronous fashion.

Among the constitutional elements possessed by the control device 100 illustrated in FIG. 1, the master-shaft operation command creation part 131 possessed by the numerical control part 120, the master-shaft operation command receiver 133 and the control unit 134A possessed by the master-shaft motor drive part 121A, and the control unit 134B possessed by the slave-shaft motor drive part 121B have similar functions as the constituent elements corresponding to the respective elements possessed by the drive system 500 that operates in the conventional master-slave synchronous system illustrated in FIG. 7. More specifically, the master-shaft operation command created by the master-shaft operation command creation part 131 passes through a communication circuit 132-1, and is sent to the master-shaft operation command receiver 133 possessed by the master-shaft motor drive part 121A. Furthermore, the master-shaft operation command receiver 133 sends the received master-shaft operation command to the control unit 134A. The control unit 134A controls the operation of the master-shaft motor 122A, based on the master-shaft operation command received from the master-shaft operation command receiver 133, and the position feedback information received from the master-shaft motor 122A. In addition, this position feedback information passes through the communication circuit 132-2 and is sent to the slave-shaft motor drive part 121B. The position feedback information sent to the slave-shaft motor drive part 121B has a predetermined synchronization ratio multiplied, and is sent to the control unit 134B of the slave-shaft motor drive part 121B. The control unit 134B drives the slave-shaft motor 122B based on the received position feedback information, and position feedback information from the slave-shaft motor 122B. Synchronous driving of the master-shaft motor 122A and slave-shaft motor 122B is thereby realized.

On the one hand, compared to the drive system 500 that operates in a conventional master-slave synchronous fashion illustrated in FIG. 7, the control device 100 illustrated in FIG. 1 mainly differs in the point of the master-shaft motor drive part 121A including a temperature acquisition part 135A, the slave-shaft motor drive part 121B including a temperature acquisition part 135B, and the numerical control part 120 including a determination part 136. More specifically, the temperature acquisition part 135A of the master-shaft motor drive part 121A acquires the temperature of the master-shaft motor 122A, and sends the acquired temperature of the master-shaft motor 122A to the determination part 136 of the numerical control part 120. Similarly, the temperature acquisition part 135B of the slave-shaft motor drive part 121B acquires the temperature of the slave-shaft motor 122B, and sends the acquired temperature of the slave-shaft motor 122B to the determination part 136 of the numerical control part 120. The determination part 136 of the numerical control part 120 sends a comparison result between the acquired temperature of the master-shaft motor 122A and a first predetermined value, and a comparison result between the acquired temperature of the slave-shaft motor 122B and a second predetermined value to the master-shaft operation command creation part 131. The master-shaft operation command creation part 131 creates a master-shaft operation command based on at least one among the above-mentioned two comparison results, and sends this master-shaft operation command to the master-shaft operation command receiver 133 possessed by the master-shaft motor drive part 121A.

Herein, the temperature acquisition part 135A possessed by the master-shaft motor drive part 121A and the temperature acquisition part 135B possessed by the slave-shaft motor drive part 121B detect or estimate the temperature of each motor by a known method. For example, a correlation value between the current value outputted from the motor and the winding temperature within the motor may be obtained to calculate the winding temperature based on the current value during operation and this correlation value, and then the temperature of each motor may be detected based on this winding temperature. Alternatively, as described in Patent Document 4, for example, the motor temperature may be estimated using the oil temperature within the motor housing, the thermal capacity and amount of heat generation of the motor, etc.

Figure 2:
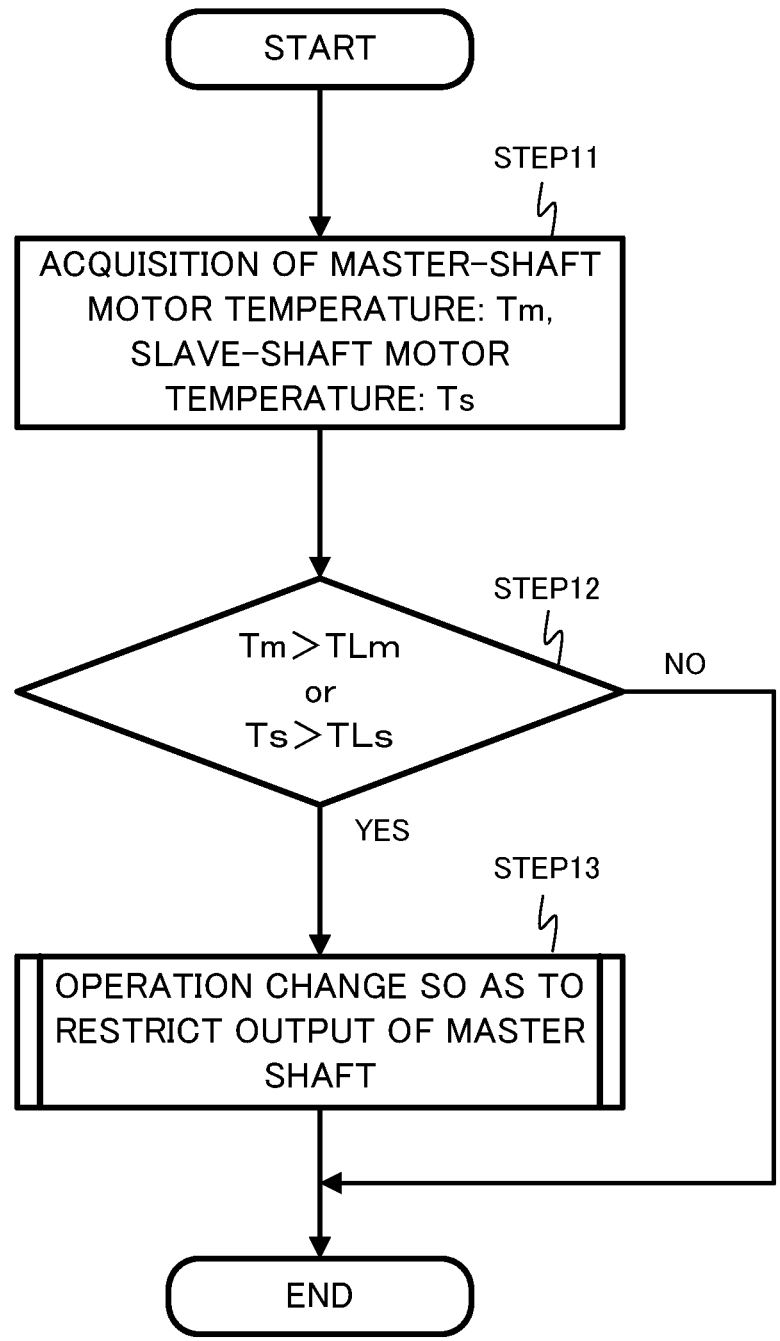
FIG. 2 is an operational flow chart used by the control device according to the first embodiment of the present invention.

FIG. 2 shows the operation flow of the above-mentioned control device 100. First, in Step 11, the temperature acquisition part 135A of the master-shaft motor drive part 121A acquires a motor temperature Tm of the master-shaft motor 122A, and the temperature acquisition part 135B of the slave-shaft motor drive part 121B acquires a motor temperature Ts of the slave-shaft motor 122B.

Next, in Step 12, the determination part 136 compares the motor temperature Tm of the master-shaft motor 122A with a predetermined value TLm, and compares the motor temperature Ts of the slave-shaft motor 122B with a predetermined value TLs. In the case of Tm being greater than TLm, or in the case of Ts being greater than TLs (YES in Step 12), it advances to Step 13, and changes operation of the master-shaft motor 122A so that the master-shaft output is restricted. The slave-shaft motor 122B is synchronously driven with the master-shaft motor 122A; therefore, operation of the slave-shaft motor 122B is similarly changed as well.

Herein, as the operation change of the master-shaft motor 122A, for example, decreasing the applied electric power to the master-shaft motor 122A to lower the torque can be exemplified. However, the embodiment of the present invention is not to be limited thereto.

In Step 12, in the case of Tm being no more than TLm, as well as Ts being no more than TLs (NO in Step 12), Step 13 is omitted, and an operation change is not done.

Second Embodiment

Next, a second embodiment will be described in detail while referencing FIGS. 3 to 6.

Figure 3:
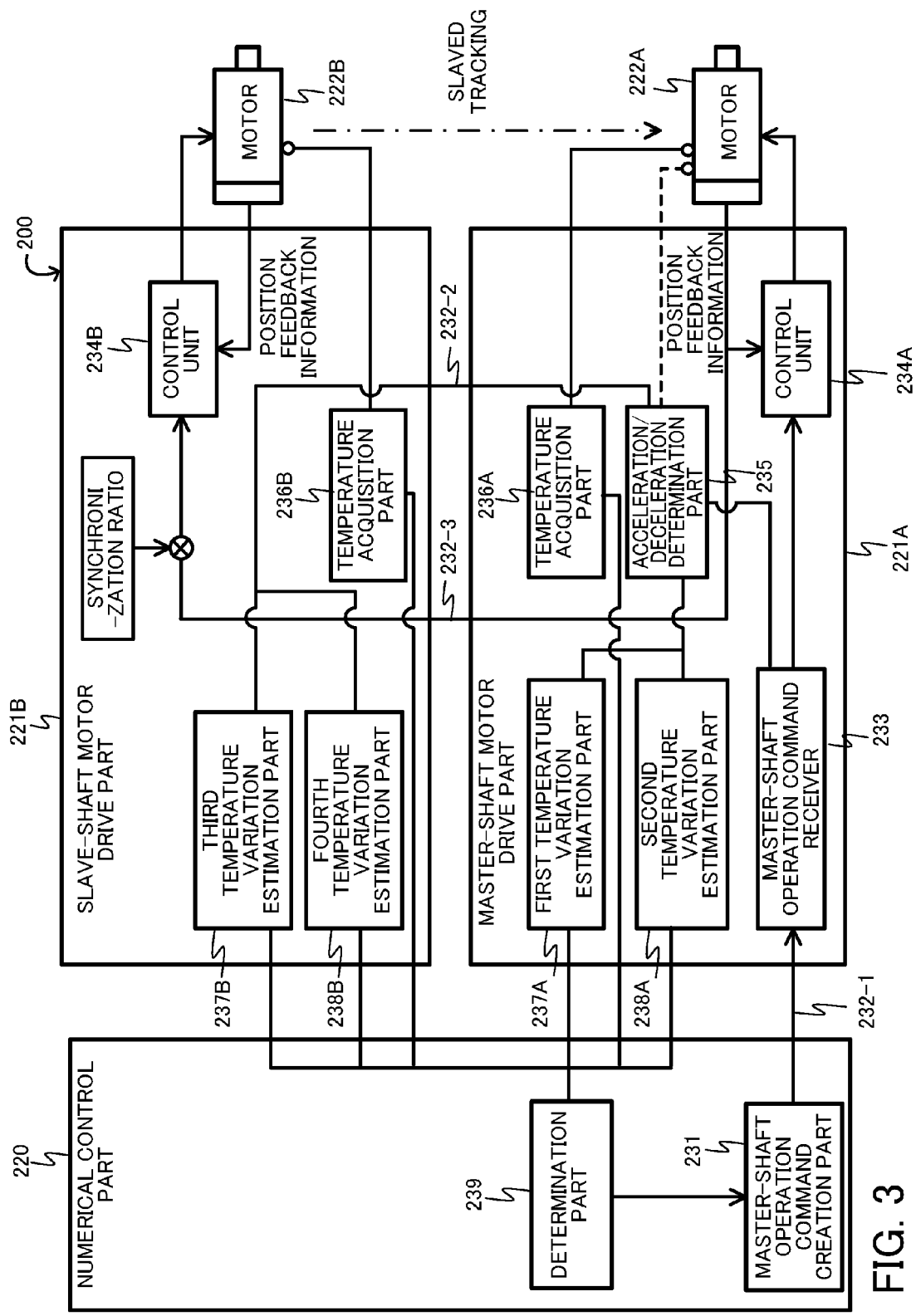
FIG. 3 is a block diagram of a control device according to a second embodiment of the present invention.

As shown in FIG. 3, a control device 200 according to the second embodiment includes a numerical control part 220, a master-shaft motor drive part 221A and a slave-shaft motor drive part 221B. Furthermore, a numerical control part 220 includes a master-shaft operation command creation part 231 and determination part 239; the master-shaft motor drive part 221A includes a master-shaft operation command receiver 233, control unit 234A, acceleration/deceleration determination part 235, temperature acquisition part 236A, first temperature variation estimation part 237A and second temperature variation estimation part 238A; and the slave-shaft motor drive part 221B includes a temperature acquisition part 236B, third temperature variation estimation part 237B and fourth temperature variation estimation part 238B.

Among the constituent elements included by the control device 200 illustrated in FIG. 3, the master-shaft operation command creation part 231 included by the numerical control part 220; the master-shaft operation command receiver 233, control unit 234A and temperature acquisition part 236A included by the master-shaft motor drive part 221A; and the control unit 234B and temperature acquisition part 236B included by the slave-shaft motor device part 221B are omitted from explanation due to having the same functions as the constituent elements corresponding to the respective elements included by the control device 100 according to the first embodiment illustrated in FIG. 1.

The control device 200 according to the second embodiment differs from the control device 100 according to the first embodiment, and the master-shaft motor drive part 221A has the acceleration/deceleration determination part 235, first temperature variation estimation part 237A and second temperature variation estimation part 238A. The acceleration/deceleration determination part 235 determines whether the master-shaft motor 222A is in a state of acceleration/deceleration, based on the master-shaft operation command received from the master-shaft operation command receiver 233. It should be noted that, as shown by the dotted line in FIG. 3, the acceleration/deceleration determination part 235 may make a determination of the acceleration/deceleration state by capturing the measured degree of the master-shaft motor 222A in a predetermined sampling cycle, rather than the master-shaft operation command received from the master-shaft operation command receiver 233. In the case of receiving a notification of the event of the present time being in the acceleration/deceleration state from the acceleration/deceleration determination part 235, the first temperature variation estimation part 237A estimates the motor temperature change of the master-shaft motor 222A while in the acceleration/deceleration state. In the case of receiving a notification of the event of the present time not being in the acceleration/deceleration state from the acceleration/deceleration determination part 235, the second temperature variation estimation part 238A estimates the motor temperature change of the master-shaft motor 222A while being in a state other than the acceleration/deceleration state. It should be noted that the above-mentioned determination of whether or not being in the acceleration/deceleration state according to the acceleration/deceleration determination part 235, and the estimation of the motor temperature change according to the first temperature variation estimation part 237A and second temperature variation estimation part 238A, for example, are able to be realized using a method described in Patent Document 5, for example.

In addition, the slave-shaft motor drive part 221B differs from the slave-shaft motor drive part 121B of the control device 100 according to the first embodiment, and has the third temperature variation estimation part 237B and fourth temperature variation estimation part 238B. In the case of receiving a notification of the present time being in the acceleration/deceleration state from the acceleration/deceleration determination part 235 through the communication circuit 232-2, the third temperature variation estimation part 237B estimates the motor temperature change of the slave-shaft motor 222B while being in the acceleration/deceleration state. In a case of receiving a notification of the present time not being in the acceleration/deceleration state from the acceleration/deceleration determination part 235 through the communication circuit 232-2, the fourth temperature variation estimation part 238B estimates the motor temperature change of the slave-shaft motor 222B while being in a state other than the acceleration/deceleration state. It should be noted that, in FIG. 3, although the acceleration/deceleration determination part is not illustrated in the slave-shaft motor drive part 221B, the slave-shaft motor drive part 221B includes the acceleration/deceleration determination part separately from the acceleration/deceleration determination part 235 possessed by the master-shaft motor drive part 221A, and the slave-shaft motor drive part 221B may determine whether the slave-shaft motor 222B is in the acceleration/deceleration state independently.

The temperature acquisition part 236A of the master-shaft motor drive part 221A acquires the temperature of the master-shaft motor 222A, and sends the acquired temperature of the master-shaft motor 222A to the determination part 239 of the numerical control part 220. Similarly, the temperature acquisition part 236B of the slave-shaft motor 222B acquires the temperature of the slave-shaft motor 222B, and sends the acquired temperature of the slave-shaft motor 222B to the determination part 239 of the numerical control part 220. In addition, each of the above-mentioned first temperature variation estimation part 237A, second temperature variation estimation part 238A, third temperature variation estimation part 237B and fourth temperature variation estimation part 238B sends the temperature variations respectively estimated to the determination part 239 of the numerical control part 220. The determination part 239 of the numerical control part 220 sends, to the master-shaft operation command creation part 231, a first comparison result between the acquired temperature of the master-shaft motor 222A and a first predetermined value, a second comparison result between the acquired temperature of the slave-shaft motor 222B and a second predetermined value, a third comparison result between the temperature variation estimated by the first temperature variation estimation part 237A and the temperature variation estimated by the second temperature variation estimation part 238A, and a fourth comparison result between the temperature variation estimated by the third temperature variation estimation part 237B and the temperature variation estimated by the fourth temperature variation estimation part 238B. The master-shaft operation command creation part 231 creates the master-shaft operation command based on at least one among the first comparison result and second comparison result, and at least one among the third comparison result and fourth comparison result, and sends this master-shaft operation command to the master-shaft operation command receiver 233 possessed by the master-shaft motor drive part 221A.

Figure 4:
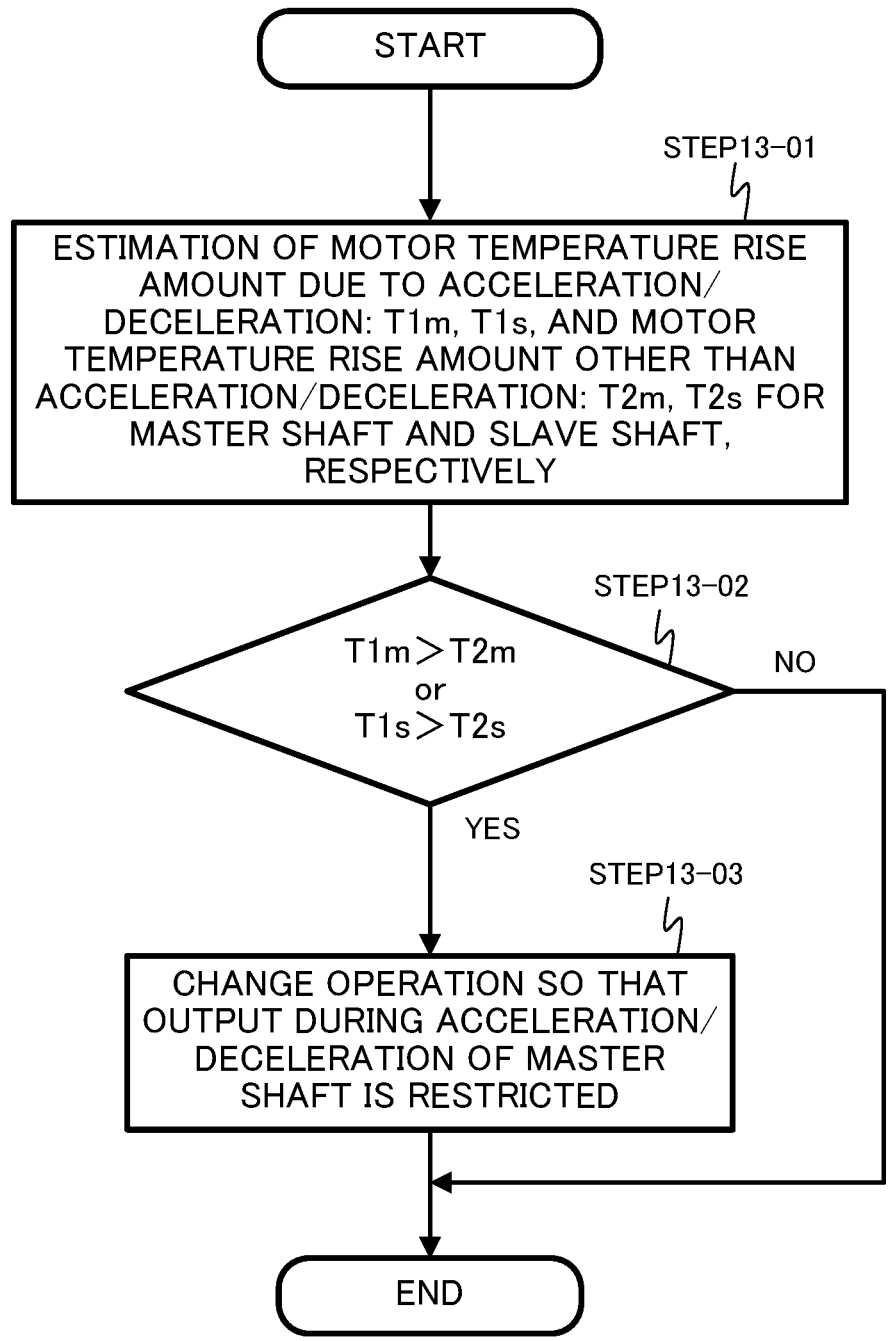
FIG. 4 is an operational flow chart used by the control device according to the second embodiment of the present invention.

A first example of the operation flow of the above-mentioned control device 200 is basically the same as the flow illustrated in FIG. 2, which is the operation flow of the control device 100 according to the first embodiment; however, in this flow, Step 13 specifically becomes the flow illustrated in FIG. 4. First, in Step 13-01, the first temperature variation estimation part 237A of the master-shaft motor drive part 221A estimates the motor temperature rise amount of the master-shaft motor 222A while in the acceleration/deceleration state, and the second temperature variation estimation part 238A estimates the motor temperature rise amount of the master-shaft motor 222A while in a state other than the acceleration/deceleration state. In addition, the third temperature variation estimation part 237B of the slave-shaft motor drive part 221B estimates the motor temperature rise amount of the slave-shaft motor 222B while in the acceleration/deceleration state, and the fourth temperature variation estimation part 238B estimates the motor temperature rise amount of the slave-shaft motor 222B while in a state other than the acceleration/deceleration state.

Next, in Step 13-02, the determination part 239 compares between a temperature rise amount T1$m$ estimated by the first temperature variation estimation part 237A and a temperature rise amount T2$m$ estimated by the second temperature variation estimation part 238A, and compares between a temperature rise amount T1$s$ estimated by the third temperature variation estimation part 237B and a temperature rise amount T2$s$ estimated by the fourth temperature variation estimation part 238B. In the case of T1$m$ being greater than T2$m$, or in the case of T1$s$ being greater than T2$s$ (YES in Step 13-02), the processing advances to Step 13-03, and changes operation of the master-shaft motor 222A so that the output during acceleration/deceleration of the master shaft is restricted. Since the slave-shaft motor 222B is synchronously driven with the master-shaft motor 222A, the operation of the slave-shaft motor 222B is similarly changed.

Herein, as the operation change of the master-shaft motor 222A such that the output during acceleration/deceleration of the master shaft is restricted, for example, the matter of changing a constant during acceleration/deceleration of the master-shaft motor 222A to lower the torque of the motor can be exemplified. However, the embodiment of the present invention is not limited thereto.

In Step 13-02, in the case of T1$m$ being no more than T2$m$, as well as T1$s$ being no more than T2$s$ (NO in Step 13-02), Step 13-03 is omitted, and the operation change is not done.

Figure 5:
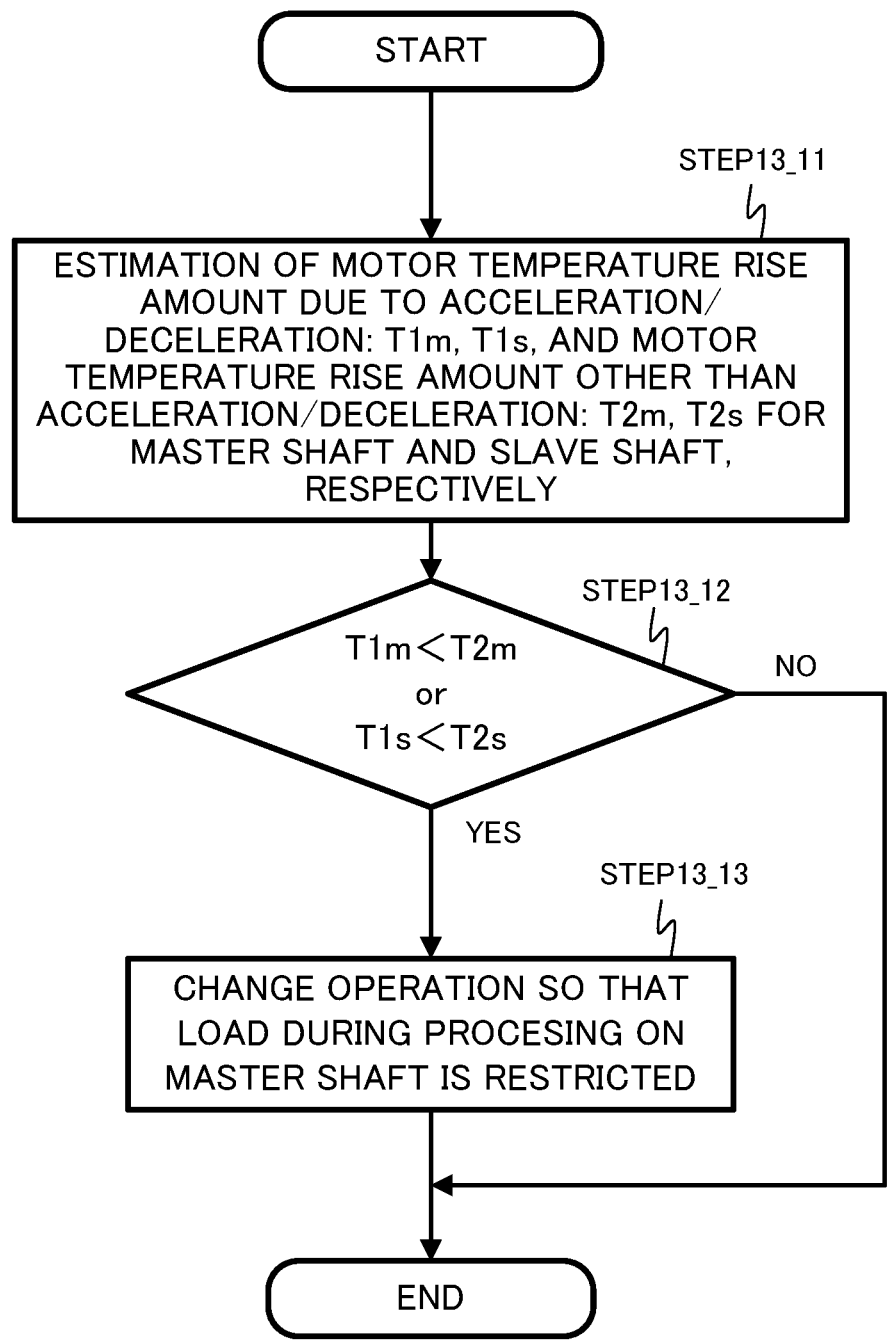
FIG. 5 is an operational flow chart used by the control device according to the second embodiment of the present invention.

A second example of the operation flow of the above-mentioned control device 200 is basically the same as the flow illustrated in FIG. 2, which is the operation flow of the control device 100 according to the first embodiment; however, in this flow, Step 13 specifically becomes the flow illustrated in FIG. 5. First, in Step 13_11, the first temperature variation estimation part 237A of the master-shaft motor drive part 221A estimates the motor temperature rise amount of the master-shaft motor 222A while in the acceleration/deceleration state, and the second temperature variation estimation part 238A estimates the motor temperature rise amount of the master-shaft motor 222A while in a state other than the acceleration/deceleration state. In addition, the third temperature variation estimation part 237B of the slave-shaft motor drive part 221B estimates the motor temperature rise amount of the slave-shaft motor 222B while in the acceleration/deceleration state, and the fourth temperature variation estimation part 238B estimates the motor temperature rise amount of the slave-shaft motor 222B while in a state other than the acceleration/deceleration state.

Next, in Step 13_12, the determination part 239 compares between the temperature rise amount T1$m$ estimated by the first temperature variation estimation part 237A and the temperature rise amount T2$m$ estimated by the second temperature variation estimation part 238A, and compares between the temperature rise amount T1$s$ estimated by the third temperature variation estimation part 237B and the temperature rise amount T2$s$ estimated by the fourth temperature variation estimation part 238B. In the case of T2$m$ being greater than T1$m$, or in the case of T2$s$ being greater than T1$s$ (YES in Step 13_12), the processing advances to Step 13_13, and changes the operation of the master-shaft motor 222A so that the load on the master shaft during machining is restricted. Since the slave-shaft motor 222B is synchronously driven with the master-shaft motor 222A, the operation of the slave-shaft motor 222B is similarly changed also.

Herein, as the operation change of the master-shaft motor 222A such that the load on the master shaft during machining is restricted, for example, in the case of the master-shaft motor 222A being the spindle motor, and the slave-shaft motor 222B being a feed-axis motor, a measure that decreases the rotation speed of the slave-shaft motor 222B, which is the feed-axis motor, by way of decreasing the speed command to the master-shaft motor 222A can be exemplified. However, the embodiment of the present invention is not limited thereto.

In Step 13_12, in the case of T1$m$ being at least T2$m$, as well as T1$s$ being at least T2$s$ (NO in Step 13_12), then Step 13_13 is omitted, and an operation change is not done.

Figure 6:
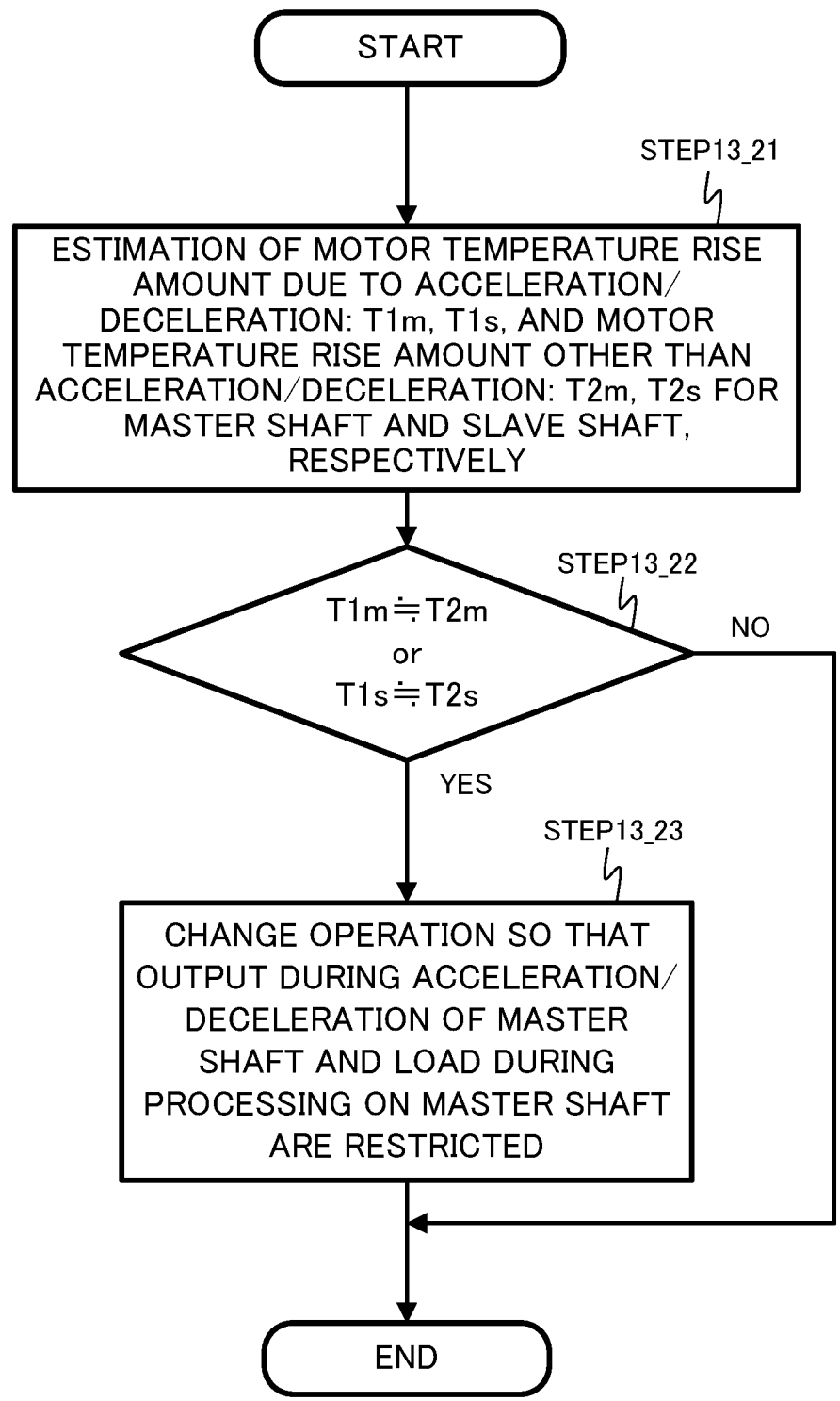
FIG. 6 is an operational flow chart used by the control device according to the second embodiment of the present invention.

A third example of the operation flow of the above-mentioned control device 200 is basically the same as the flow illustrated in FIG. 2, which is the operation flow of the control device 100 according to the first embodiment; however, in this flow, Step 13 specifically becomes the flow illustrated in FIG. 6. First, in Step 13_21, the first temperature variation estimation part 237A of the master-shaft motor drive part 221A estimates the motor temperature rise amount of the master-shaft motor 222A while in the acceleration/deceleration state, and the second temperature variation estimation part 238A estimates the motor temperature rise amount of the master-shaft motor 222A while in a state other than the acceleration/deceleration state. In addition, the third temperature variation estimation part 237B of the slave-shaft motor drive part 221B estimates the motor temperature rise amount of the slave-shaft motor 222B while in the acceleration/deceleration state, and the fourth temperature variation estimation part 238B estimates the motor temperature rise amount of the slave-shaft motor 222B while in a state other than the acceleration/deceleration state.

Next, in Step 13_22, the determination part 239 compares between the temperature rise amount T1$m$ estimated by the first temperature variation estimation part 237A and the temperature rise amount T2$m$ estimated by the second temperature variation estimation part 238A, and compares between the temperature rise amount T1$s$ estimated by the third temperature variation estimation part 237B and the temperature rise amount T2$s$ estimated by the fourth temperature variation estimation part 238B. In the case of T1$m$ and T2$m$ being substantially identical, or in the case of T1$s$ and T2$s$ being substantially identical, specifically in the case of the difference between T1$m$ and T2$m$ being within a predetermined range, or a case of the difference between T1$s$ and T2$s$ being within a predetermined range (YES in Step 13_22), the processing advances to Step 13_23, and changes the operation of the master-shaft motor 222A so that both the output during acceleration/deceleration of the master shaft and load on the master shaft during machining are restricted. Since the slave-shaft motor 222B is synchronously driven with the master-shaft motor 222A, the operation of the slave-shaft motor 222B is similarly changed as well.

Herein, as the operation change of the master-shaft motor 222A such that the output during acceleration/deceleration of the master shaft is restricted, similarly to the first example, the matter of changing a constant during acceleration/deceleration of the master-shaft motor 222A to lower the torque of the motor can be exemplified, for example. However, the embodiment of the present invention is not limited thereto.

In addition, as the operation change of the master-shaft motor 222A such that the load on the master shaft during machining is restricted, similarly to the second example, in the case of the master-shaft motor 222A being the spindle motor, and the slave-shaft motor 222B being a feed-axis motor, a measure that decreases the rotation speed of the slave-shaft motor 222B, which is the feed-axis motor, by way of decreasing the speed command to the master-shaft motor 222A can be exemplified, for example. However, the embodiment of the present invention is not limited thereto.

In Step 13_22, in the case of the difference between T1$m$ and T2$m$ not being within a predetermined range, and in the case of the difference between T1$s$ and T2$s$ also not being within a predetermined range (NO in Step 13_22), Step 13_23 is omitted, and the operation change is not done.

Even when using either of the control device 100 according to the first embodiment and the control device 200 according to the second embodiment, it becomes possible to avoid overheating of both shafts, by monitoring the motor temperatures of both the master shaft and slave shaft, and controlling operation of the slave shaft according to the operation control on the master shaft. Above all, with the control device 200 according to the second embodiment, it is possible to change the content of the operation command to the master-shaft motor 222A, and consequently the slave-shaft motor 222B, according to acceleration/deceleration, which is a primary factor in the temperature rise of the motor temperature, or primary factors other than this, and thus it becomes possible to further avoid overheating of both shafts.

Although embodiments of the present invention are explained above, the present invention is not to be limited to the aforementioned embodiments. In addition, the effects described in the present embodiment are merely listing the most preferred effects produced from the present invention, and the effects according to the present invention are not limited to those described in the present embodiment.

The control method according to the control device 100 or control device 200 is realized by way of software. In the case of being realized by way of software, the programs constituting this software are installed to a computer (control device 100 or control device 200). In addition, these programs may be recorded on removable media and distributed to users, or may be distributed by being downloaded to the computer of the user via a network. Furthermore, these programs may be provided to the computer (control device 100 or control device 200) of the user as a Web service via a network without being downloaded.

EXPLANATION OF REFERENCE NUMERALS 100, 200 control device
120, 220 numerical control part
121A, 221A master-shaft motor drive part
121B, 221B slave-shaft motor drive part
122A, 222A master-shaft motor
122B, 222B slave-shaft motor
131, 231 master-shaft operation command creation part
132-1, 132-2, 232-1, 232-2, 232-3 communication circuit
133, 233 master-shaft operation command receiver
134A, 134B, 234A, 234B control unit
135A, 135B, 236A, 236B temperature acquisition part
136, 239 determination part
235 acceleration/deceleration determination part
237A first temperature variation estimation part
238A second temperature variation estimation part
237B third temperature variation estimation part
238B fourth temperature variation estimation part
500 drive system
520 numerical control part
521A master-shaft motor drive part
521B slave-shaft motor drive part
522A master-shaft motor
522B slave-shaft motor
531 master-shaft operation command creation part
532-1, 532-2 communication circuit
533 master-shaft operation command receiver
534-A, 534-B control unit

What is claimed is:
1. A control device for a machine tool, the control device comprising:
a master-shaft motor drive part that drives a master-shaft motor,
a slave-shaft motor drive part that drives a slave-shaft motor, and
a numerical control part that sends a master-shaft operation command to the master-shaft motor drive part,
wherein the master-shaft motor drive part drives the master-shaft motor based on the master-shaft operation command received from the numerical control part, and the slave-shaft motor drive part drives the slave-shaft motor so as to synchronize with the master-shaft motor, based on position feedback information received from the master-shaft motor through the master-shaft motor drive part, wherein the master-shaft motor drive part includes a first temperature acquisition part that acquires a temperature of the master-shaft motor, wherein the slave-shaft motor drive part includes a second temperature acquisition part that acquires a temperature of the slave-shaft motor, wherein the numerical control part creates the master-shaft operation command as a command to restrict output of the master-shaft motor, upon the temperature of the master-shaft motor received from the first temperature acquisition part exceeding a first predetermined value, and wherein the numerical control part creates the master-shaft operation command as the command to restrict output of the master-shaft motor, upon the temperature of the slave-shaft motor received from the second temperature acquisition part exceeding a second predetermined value.

2. The control device according to claim 1, wherein the master-shaft motor drive part includes an acceleration/deceleration determination part that determines if the master-shaft motor is performing an acceleration/deceleration operation, or is performing an operation other than acceleration/deceleration, a first temperature variation estimation part that estimates a temperature change of the master-shaft motor according to current flowing in an acceleration/deceleration operation period of the master-shaft motor, and a second temperature variation estimation part that estimates a temperature change of the master-shaft motor according to current flowing in a period of operation other than acceleration/deceleration operation of the master-shaft motor, wherein the slave-shaft motor drive part includes a third temperature variation estimation part that estimates a temperature change of the slave-shaft motor according to current flowing in an acceleration/deceleration operation period of the master-shaft motor, and a fourth temperature variation estimation part that estimates a temperature change of the slave-shaft motor according to current flowing in a period of an operation other than the acceleration/deceleration operation of the master-shaft motor, and wherein the numerical control part creates the master-shaft operation command to change operation of the master-shaft motor, based on at least one among a comparison result between the temperature change estimated by the first temperature variation estimation part and the temperature change estimated by the second temperature variation estimation part, and a comparison result between the temperature change estimated by the third temperature variation estimation part and the temperature change estimated by the fourth temperature variation estimation part.

3. The control device according to claim 2, wherein the numerical control part creates the master-shaft operation command as a command to restrict output of the master-shaft motor during acceleration/deceleration of the master-shaft motor, in a case of the temperature change estimated by the first temperature variation estimation part being greater than the temperature change estimated by the second temperature variation estimation part, or in a case of the temperature change estimated by the third temperature variation estimation part being greater than the temperature change estimated by the fourth temperature variation estimation part.

4. The control device according to claim 2, wherein the numerical control part creates the master-shaft operation command as a command to restrict load during machining on the master shaft, in a case of the temperature change estimated by the first temperature variation estimation part being smaller than the temperature change estimated by the second temperature variation estimation part, or in a case of the temperature change estimated by the third temperature variation estimation part being smaller than the temperature change estimated by the fourth temperature variation estimation part.

5. The control device according to claim 2, wherein the numerical control part creates the master-shaft operation command as a command to restrict output of the master-shaft motor during acceleration/deceleration of the master-shaft motor and to restrict load during machining on the master shaft, in a case of a difference between the temperature change estimated by the first temperature variation estimation part and the temperature change estimated by the second temperature variation estimation part being within a predetermined value, or in a case of a difference between the temperature change estimated by the third temperature variation estimation part and the temperature change estimated by the fourth temperature variation estimation part being within a predetermined value.

6. A control method for a machine tool, using a master-shaft motor drive part that drives a master-shaft motor, a slave-shaft motor drive part that drives a slave-shaft motor and a numerical control part that sends a master-shaft operation command to the master-shaft motor drive part, the method comprising the steps of:

driving the master-shaft motor by way of the master-shaft motor drive part based on the master-shaft drive command received from the numerical control part; driving the slave-shaft motor by way of the slave-shaft motor drive part so as to synchronize with the master-shaft motor, based on position feedback information received from the master-shaft motor through the master-shaft motor drive part;

acquiring a temperature of the master-shaft motor by way of a first temperature acquisition part included in the master-shaft motor drive part;

acquiring a temperature of the slave-shaft motor by way of a second temperature acquisition part included in the slave-shaft motor drive part;

creating the master-shaft operation command by way of the numerical control part as a command to restrict output of the master-shaft motor, upon the temperature of the master-shaft motor received from the first temperature acquisition part exceeding a first predetermined value, and creating the master-shaft operation command by way of the numerical control part as the command to restrict output of the master-shaft motor, upon the temperature of the slave-shaft motor received from the second temperature acquisition part exceeding a second predetermined value.

* * * * *